(12) United States Patent
Nakagawa et al.

(10) Patent No.: US 6,711,874 B1
(45) Date of Patent: Mar. 30, 2004

(54) AUTOMATIC PACKAGE INSPECTING SYSTEM

(75) Inventors: Yukio Nakagawa, Shiga (JP); Katsuaki Kono, Shiga (JP); Yasushi Yamaguchi, Kyoto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/545,029

(22) Filed: Apr. 7, 2000

(30) Foreign Application Priority Data

Apr. 7, 1999 (JP) ............................................ 11-099645
Apr. 7, 1999 (JP) ............................................ 11-099908

(51) Int. Cl.[7] .............................................. B65B 57/02
(52) U.S. Cl. ................................ 53/64; 53/502; 53/551
(58) Field of Search ........................... 53/53, 502, 551, 53/64; 700/240, 213, 231, 305

(56) References Cited

U.S. PATENT DOCUMENTS

| | | | |
|---|---|---|---|
| 4,813,205 A | * | 3/1989 | Mikata et al. |
| 5,251,422 A | * | 10/1993 | Goodman et al. |
| 5,577,364 A | * | 11/1996 | Wang et al. |
| 5,622,025 A | * | 4/1997 | Kitagawa et al. |
| 5,802,803 A | * | 9/1998 | Kitagawa et al. |
| 5,881,532 A | * | 3/1999 | Kitagawa |

| | | | |
|---|---|---|---|
| 6,285,918 B1 | * | 9/2001 | Kono |

FOREIGN PATENT DOCUMENTS

| | | |
|---|---|---|
| EP | 0614834 | 9/1994 |
| EP | 0661212 | 7/1995 |
| JP | 7-187153 | * 7/1995 |

* cited by examiner

*Primary Examiner*—Eugene Kim
(74) *Attorney, Agent, or Firm*—Hogan & Hartson, LLP

(57) ABSTRACT

A package inspecting system includes a packaging machine 200 including a vertical sealing device 201 for sealing opposite longitudinal side edges of a packaging material F, which extend in a direction conforming to a direction of flow of the packaging material F, together to render the packaging material F into a tubular form, and an end sealing device 202 for sealing an end of the tubular packaging material F after articles M have been filled in the tubular packaging material F, to thereby provide a bagged product M1, and a seal checker 400 for inspecting a sealing condition of the packaging material F of the bagged product M1. The package inspecting system also includes a bite detecting means 21 provided in the packaging machine 200 for detecting whether or not the articles M are bitten in the end of the packaging material F so that the presence or absence of an abnormal condition and a content of abnormality in each of the sealing devices 201, 202 can be diagnosed based on a result of detection, performed by the bite detecting means 21, and a result of inspection performed by the seal checker 400 with respect to the same bagged product M1.

20 Claims, 15 Drawing Sheets

DIAGNOSIS HISTORY STORAGE 53a

| No. | BITE | SEAL CHECKER |
|-----|------|--------------|
| n | NO | ACCEPTABLE |
| : | : | : |
| 3 | YES | UNACCEPTABLE |
| 2 | YES | |
| 1 | YES | |

→ DISPLAY OF RESULT OF DIAGNOSIS

Fig. 5B

|  | BITE DETECTING MEANS (END SEAL) | |
|---|---|---|
|  | NO BITE | BITE DETECTED |
| SEAL DETECTING MEANS — ACCEPTABLE | NORMAL(1) | TROUBLE IN SEAL CHECKER → INDICATION (2) |
| SEAL DETECTING MEANS — LEAKAGE UNACCEPTABLE | DEFECTIVE VERTICAL SEAL → INDICATION(3) | DEFECTIVE END SEAL → INDICATION(4) |

Fig. 6A

DIAGNOSIS HISTORY STORAGE 53a

| | FORE-AND-AFT SYMPTOM | SEAL CHECKER | RESULT OF DIAGNOSIS |
|---|---|---|---|
| N TIMES PRECEDING | 0 | UNACCEPTABLE | NG |
| : | 0 | UNACCEPTABLE | NG |
| : | 0 | UNACCEPTABLE | TROUBLE IN SEALER |
| : | 0 | UNACCEPTABLE | TROUBLE IN SEALER |
| : | FORE-AND-AFT SYMPTOM | UNACCEPTABLE | DEFECTIVE END SEAL |
| : | FORE-AND-AFT SYMPTOM | UNACCEPTABLE | DEFECTIVE END SEAL |
| : | : | : | |
| 3 TIMES PRECEDING | 0 | ACCEPTABLE | |
| 2 TIMES PRECEDING | FORE-AND-AFT SYMPTOM | UNACCEPTABLE | DEFECTIVE END SEAL |
| 1 TIME PRECEDING | FORE-AND-AFT SYMPTOM | UNACCEPTABLE | DEFECTIVE END SEAL |

FREQUENCY CALCULATION

Fig. 8B

WEIGHT HISTORY STORAGE 33a

|   | COMBINED CALCULATED VALUE Wc | POST-WEIGHED VALUE Ws | FORE-AND-AFT SYMPTOM |
|---|---|---|---|
| n | 100.3 | 100.2 | 0 |
| . | . | . | . |
| . | . | . | . |
| 3 | 100.4 | 100.3 | 0 |
| 2 | 100.2 | 80.0 | FORE-AND-AFT SYMPTOM |
| 1 | 100.1 | 119.5 | FORE-AND-AFT SYMPTOM |

Fig. 9B

AUTOMATIC PACKAGE INSPECTING SYSTEM

BACKGROUND OF THE INVENTION

1. Field of the Invention

The present invention relates to a package inspecting system for automatically inspecting the package of a product to determine if the product is properly packaged.

2. Description of the Prior Art

An exemplary package inspecting system according to the prior art will be discussed with reference to FIG. 1 which also shows one of preferred embodiments of the present invention. Referring to FIG. 1, quantities of articles M successively discharged from a combination weighing apparatus 1 and then falling onto a chute 203 are successively packaged by a combined bagging and packaging machine 200. The combined bagging and packaging machine 200 includes a vertical sealer (a vertical sealing device) 201 for sealing together opposite longitudinal side edges of a web of film F that is used as a packaging material so that that web of film F can be formed into a tubular form, and an end sealer (an end sealing device) 202 for thermally sealing a downwardly oriented end of the tubular film F and also for subsequently thermally sealing and cutting an upwardly oriented end F1 of the tubular film F after the individual quantity of the articles M have been received within the tubular film F, thereby producing a bagged product M1. Thus, the combined bagging and packaging machine 200 successively produces bagged products M1 each containing the quantity of the articles M, and the bagged products M1 so produced are successively transported to a weight checker 300 that checks the bagged products M1 one at a time to determine if the weight of the articles M in each bagged product M1 falls within an acceptable tolerance. After the bagged products M1 have been checked at to their weight by the weight checker 300, the bagged products M1 are successively transported to a seal checker 400 where a sealing condition of each of the bagged products M1 is checked.

It has, however, been found that mere inspection of the sealing condition of the respective bagged product M1 is ineffective to provide an indication of which one of the longitudinal side sealer 201 and the end sealer 202 has failed to operate properly. In order to specify one of the longitudinal side sealer 201 and the end sealer 202 that has in effect failed to operate properly, a problem has hitherto been encountered in that substantial amounts of labor and time are required, resulting in reduction in productivity of the system as a whole.

SUMMARY OF THE INVENTION

Accordingly, the present invention has for its primary object to facilitate identification of one of the sealers that has failed to operate properly so that the productivity of the package inspecting system and the yield of the bagged products being produced can be increased.

To this end, the present invention in one aspect thereof provides a package inspecting system which includes a packaging machine and a seal checker for inspecting a sealing condition of the packaging material of the bagged product. The package inspecting system also includes a bite detecting means provided in the packaging machine for detecting whether or not the articles are bitten in the end of the packaging material. In this construction, the presence or absence of an abnormal condition or a content of abnormality in each of the sealing devices is diagnosed based on a result of detection, performed by the bite detecting means, and a result of inspection performed by the seal checker with respect to the same bagged product.

With this structure according to the present invention, by diagnosing the presence or absence of abnormality in one or both of the sealing devices based on the result of detection, performed by the bite detecting means, and the result of inspection performed by the seal checker with respect to the same bagged product, and then by indicating the result of diagnosis, an operator can quickly diagnose (determine) the presence or absence of abnormality in one of the sealing devices for forming the longitudinal side seal and the end seal and, also, the presence or absence of abnormality in the seal checker. Accordingly, the productivity of the system and the yield of production of the bagged products can be increased. Moreover, since the above described diagnosis can be implemented in a simple manner merely by adding a microcomputer executable program, the cost will not increase so much.

Preferably, the result of diagnosis can be informed by an indicating means.

The bite detecting means detects whether or not a bite has occurred at an end of the packaging material (i.e., an end of the packaging material in a longitudinal direction of the bagged product). On the other hand, the seal checker detects the presence or absence of leakage (i.e., leakage of air) from the packing material of the bagged product. If the articles are bitten in the sealed portion of the packaging material, leakage generally occurs. Accordingly, where with respect to the same bagged product leakage occurs although no bite has been detected, it can be generally inferred that a trouble may have occurred in the vertical sealing device.

The term "article (or articles)" hereinbefore and hereinafter employed is intended to mean an aggregation of items that are weighed and bagged, and the term "bagged product" is intended to mean the aggregation that has been bagged. The wording "to diagnosis an abnormal condition or a content of abnormality" is intended to mean presumption or estimation in any way whatsoever in connection with abnormality of any one of the sealing devices and, for example, presumption of which one of the sealing devices has suffered from an abnormal condition. The term "indicating means" is intended to encompass, for example, a liquid crystal display device, a cathode ray tube display device or a warning lamp.

According to another aspect of the present invention, there is provided a package inspecting system including a packaging machine, a weight checker, a seal checker for inspecting a sealing condition of the packaging material of the bagged product, a determining means for diagnosing the abnormal condition or the content of abnormality occurring in each of the sealing devices based on respective results of detection and inspection performed by the seal checker and the weight checker with respect to the same bagged product, and an indicating means operable to indicate a result of the diagnosis.

According to still another aspect of the present invention, by diagnosing the presence or absence of abnormality in one or both of the sealing devices based on the result of detection performed by the weight checker and the result of inspection performed by the seal checker with respect to the same bagged product, and then by indicating the result of diagnosis, an operator can quickly ascertain the presence or absence of abnormality in one of the sealing devices for forming the longitudinal side seal and the end seal. Accordingly, the productivity of the system and the yield of production of the bagged products can be increased. Moreover, since the above-described diagnosis can be implemented in a simple manner merely by adding a microcomputer executable program, the cost will not increase very much.

In this alternative system, depending on the overweight and the underweight detected by the weight checker, for example, depending on whether or not excess and deficiency of the bagged product weighed previously and those of the bagged product weighed currently have a complemental relation with each other (which is hereinafter referred to as "fore-and-aft symptom"), it is determined which one of the vertical sealing and end sealing devices is abnormal in operation.

The term "to have a complemental relationship" means that an overweight and an underweight are found in the advancing and following bagged products and, at the same time, the sum of the excess and deficiency of the previously weighed bagged product and the excess and deficiency of the currently weighed bagged product is equal to or close to zero.

Such complemental relation occurs in the following case. Specifically, if the weighing and packaging speeds are increased, the advancing articles falling and the aggregation of the following articles are close to each other. Accordingly, if the timing of the end seal of the bag deviates, a portion of the following articles may mingle into the advancing articles or a portion of the advancing articles may mingle into the following articles. The complemental relation occurs when the articles are bagged with a portion of the advancing or following articles being mingled into the following or advancing articles, respectively. This tendency often occurs where the articles are relatively bulky and may result from the fact that the articles falling through a portion of a chute, which forms a bottleneck, are braked. Accordingly, where with respect to the same bagged product, a defective seal occurs as determined by the seal checker and, at the same time, the fore-and-aft symptom occurs, it can be inferred that the defective seal has been caused as a result of a delay in sealing timing of the end sealing device. On the other hand, if the defective seal as determined by the seal checker is repeated continuously and, at the same time, no fore-and-aft symptom occurs, it can be inferred that the defective seal has been caused as a result of, for example, a lowering of the temperature in one of the vertical sealing device and the end sealing device.

In addition to the results of inspection performed by the checkers, if the previously described determination is carried out relying on whether the result of inspection performed by the seal checker indicating unacceptable is repeated continuously, the reliability of determination can be increased.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 5B is a schematic structural diagram showing a portion of contents stored in a storage unit of the system;

FIG. 6A is a table showing results of diagnosis performed by the system;

FIG. 8B is a table showing a portion of the contents stored in the storage unit of the system;

FIG. 9B is a table showing a portion of the contents stored in the storage unit of the system;

DETAILED DESCRIPTION OF THE EMBODIMENTS

One preferred embodiment of the present invention will now be described with reference to the accompanying drawings. In the first place, a weighing, packaging and boxing system to which the present invention is applied will be briefly described.

Figure 1:
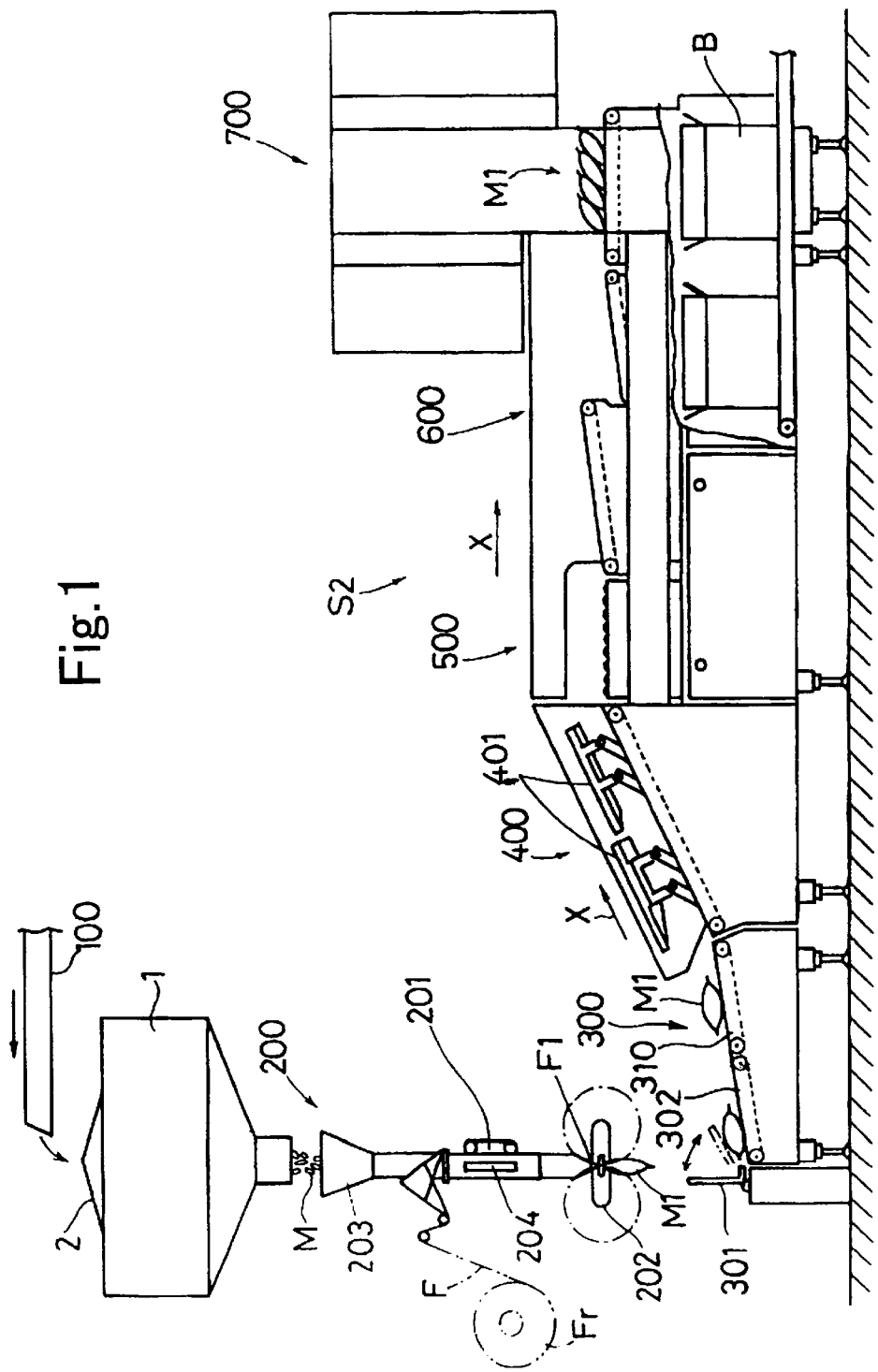
FIG. 1 is a schematic side view showing a weighing, packaging and inspecting system according to a preferred embodiment of the present invention.

Referring to FIG. 1, reference numeral 100 represents a transport conveyor, reference numeral 1 represents a combination weighing apparatus; reference numeral 200 represents a combined bagging and packaging machine (a packaging machine); reference numeral 300 represents a weight checker (a weighing conveyor); reference numeral 400 represents a seal checker; and reference numeral 700 represents a boxing machine.

The transport conveyor 100 is operable to transport articles M of products successively towards a delivery station at which the articles M are delivered onto a central region of a dispensing feeder 2. The combination weighing apparatus 1 includes a plurality of weighing hoppers (not shown) and is operable to combine weights of the articles M supplied thereto so that the article M can attain a target weight or a weight approximately equal to the target weight. The articles M attaining the target weight or the weight approximately equal to the target weight are subsequently allowed to fall onto the combined bagging and packaging machine 200 positioned below the combination weighing apparatus 1.

The combined bagging and packaging machine 200 referred to above is a so-called vertical-type pillow packaging machine that includes a vertical sealer (a vertical sealing device) 201 for sealing together opposite longitudinal side edges of a web of film F, which is used as a packaging material and which is drawn from a roll of film Fr so that that web of film F can be formed into a tubular form, and an end sealer (an end sealing device) 202 for thermally sealing a downwardly oriented end of the tubular film F and also for subsequently thermally sealing and cutting an upwardly oriented end F1 of the tubular film F after the articles M have been received within the tubular film F, thereby producing bagged products M1 successively at a predetermined cycle time. This combined bagging and packaging machine may be of a type disclosed in, for example, the Japanese Laid-open Patent Publication No. 4-128105 and, therefore, the details thereof are not herein reiterated for the sake of brevity. Instead, the disclosure of the Japanese Laid-open Patent Publication No. 4-128105 is herein incorporated by reference.

The bagged products M1 successively fall downwards by gravity onto a delivery conveyor 302. The bagged products M1 successively received by the delivery conveyor 302 are laid down by a knock-down member 301 and are then transported. The bagged products M1 so transported are successively delivered onto a weight checker 300.

The weight checker 300 referred to above includes a weight detector 305 (FIG. 5A), which may be a load cell, for measuring the weight of each of the bagged products M1 and a conveyor 310 supported on the weight detector 305. The weight checker 300 shown in FIG. 1 is operable to measure and inspect the weight of each of the bagged products M1 while the bagged products M1 are transported generally slantwise upwardly by the conveyor 310. The bagged products M1 are thereafter transported towards a seal checker 400 successively.

The seal checker 400 referred to above is of a design wherein while each of the bagged products M1 successively transported from the weight checker 300 are pressed from above by a presser tool 401, the sealing condition and the length of each of the bagged products M1 can be inspected. Depending on a result of inspection performed by the seal checker 400, a sorting device 500 positioned downstream of the seal checker 400 with respect to the direction of successive transport of the bagged products M1 is operable to reject the bagged product M1 out of the system if the latter is found unacceptable by the seal checker 400, but to deliver the bagged product M1 towards a downstream processing station if such bagged product M1 is found acceptable by the seal checker 400. The bagged products M1 found acceptable by the seal checker 400 are subsequently transported by a transport mechanism, including the sorting device 500 and a lineup transport unit 600, towards a boxing machine 700 at which the bagged products M1 are successively loaded in a cardboard box B.

The details of the combined bagging and packaging machine 200 will now be described.

Figure 2:
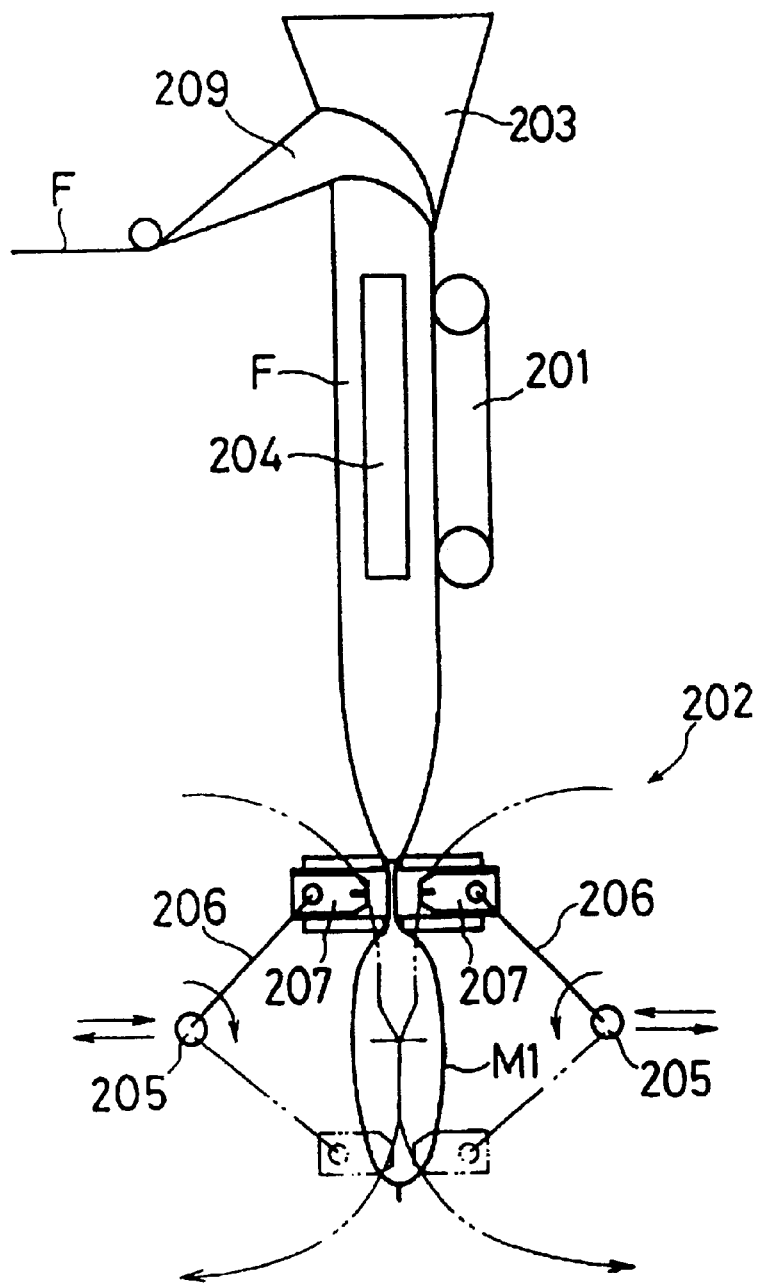
FIG. 2 is a schematic side view showing an example of a combined bagging and packaging machine.

Referring to FIG. 2, the web of film F is formed into a tubular form by a former 209. The combined bagging and packaging machine 200 includes a generally endless pull-down belt 204 capable of pulling the tubular film F downwards while vacuum-sucking a side surface of the tubular film F. While the tubular film F is pulled downwards by the pull-down belt 204, the vertical sealer 201, positioned laterally of the tubular film F being pulled downwards, seals opposite longitudinal side edges of the tubular film F together to thereby complete a film tube.

The end sealer 202 positioned downstream of the vertical sealer 201 includes two sets of a rotary shaft 205, an arm 206 and a sealing jaw 207. The end sealer 202 is so designed and so configured that while the arms 206 are intermittently swung in respective directions opposite to each other, the rotary shafts 205 are reciprocatedly moved horizontally in respective directions opposite to each other at a predetermined timed relationship with each other so that the sealing jaws 207 mounted on respective free ends of the arms 206 can move so as to depict a generally D-shaped path. The detailed structure of the end sealer 202 is disclosed in the International Publication No. WO 93/07058.

Figure 3:
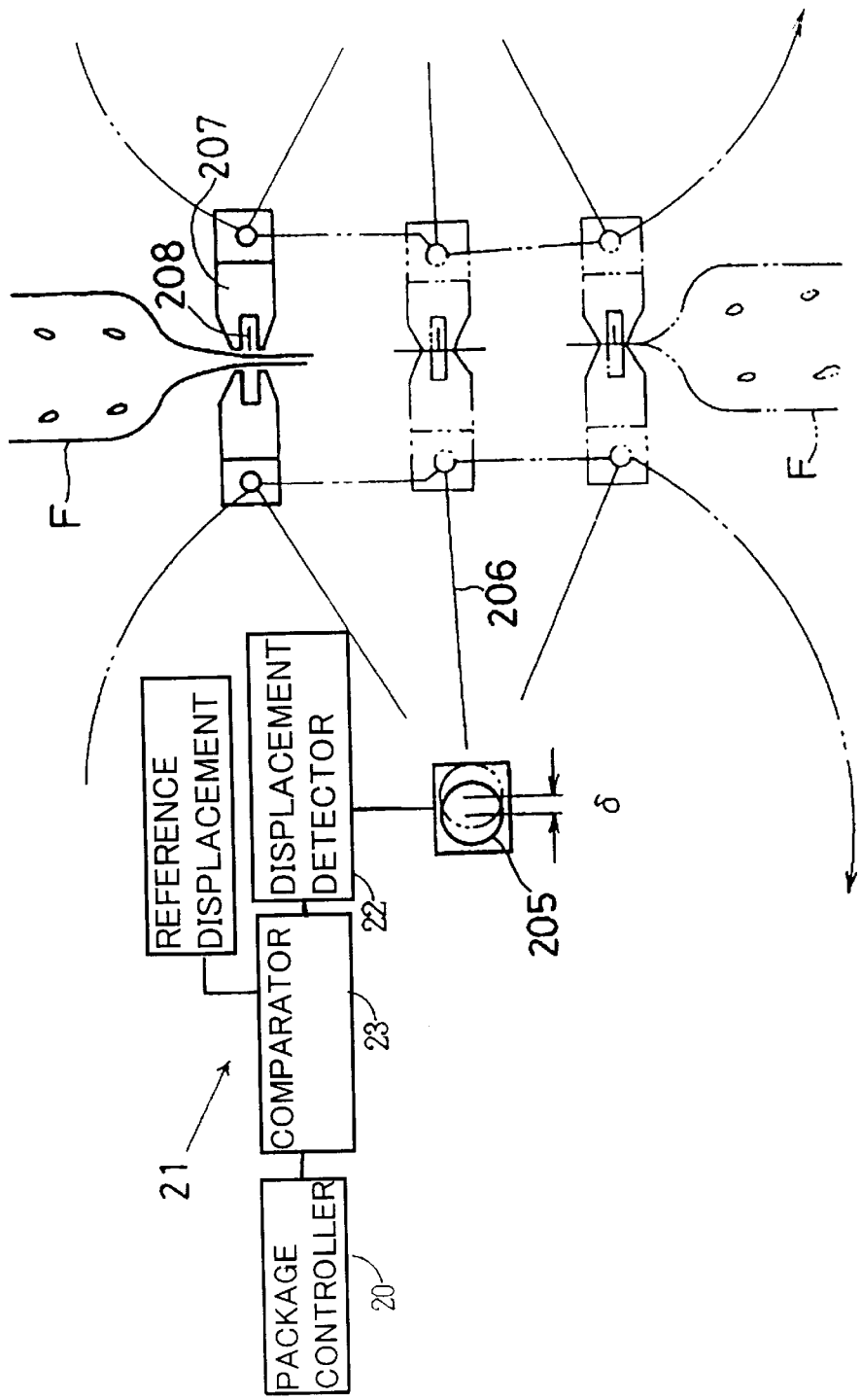
FIG. 3 is a schematic structural diagram showing one example of a bite detecting means.

The sealing jaws 207 shown in FIG. 3 start their swinging motion in response to receipt of a discharge completion signal outputted from the combination weighing apparatus 1, and when the sealing jaws 207 being swung are brought to a position where they are brought in abutment with each other, the sealing jaws 207 are moved substantially straight downwards while stripping the tube of film F. During the straight downward movement of the sealing jaws 207 accompanied by a correspondingly downward pull of the tube of film F, the sealing jaws 207 cooperate with each other to form an end seal, which extends in a direction perpendicular to the web of the tube of film F, whereupon a cutter 208 built in one of the sealing jaws 207 cuts the tube of film F across the end seal. After the tube of film F is so cut across the end seal thereof, the sealing jaws 207 return to respective initial positions while swinging along a generally arcuate path. It is to be noted that the rotary shafts 205 are rotated and driven in reciprocation by respective servo-motors (not shown) so as to allow the sealing jaws 207 to move along the generally D-shaped path in the manner described above.

A bite detecting means 21 shown in FIG. 3 will now be described. This bite detecting means 21 includes a detecting head 22 provided in one or both of the sealing jaws 207 for detecting a displacement δ of the distance (information concerning the distance) between the paired sealing jaws 207 during the sealing operation, and a comparing means 23 for comparing the displacement δ with a reference displacement. Depending on whether or not the displacement δ is larger than the reference displacement, whether or not the article M is bitten in the sealed end (sealed portion) of the tube of film F, and a result of detection performed by the bite detecting means 21 is outputted to a packaging controller 20. It is to be noted that the detecting head 22 referred to above may be employed in the form of any suitable means such as, for example, a proximity switch or an encoder mounted on a servo-motor for reciprocatedly driving the rotary shaft 205 in the horizontal direction.

The details of the end sealer 202 discussed above are disclosed in the Japanese Laid-open Patent Publication No. 5-278729, the disclosure of which is herein incorporated by reference. Also, the bite detecting means 21 discussed above may be of a type disclosed in the Japanese Laid-open Patent Publication No. 7-187153, the disclosure of which is herein incorporated by reference.

A seal detecting means 41 provided in the seal checker 400 of the type discussed hereinabove and shown in FIG. 4 will now be described in detail.

Figure 4:
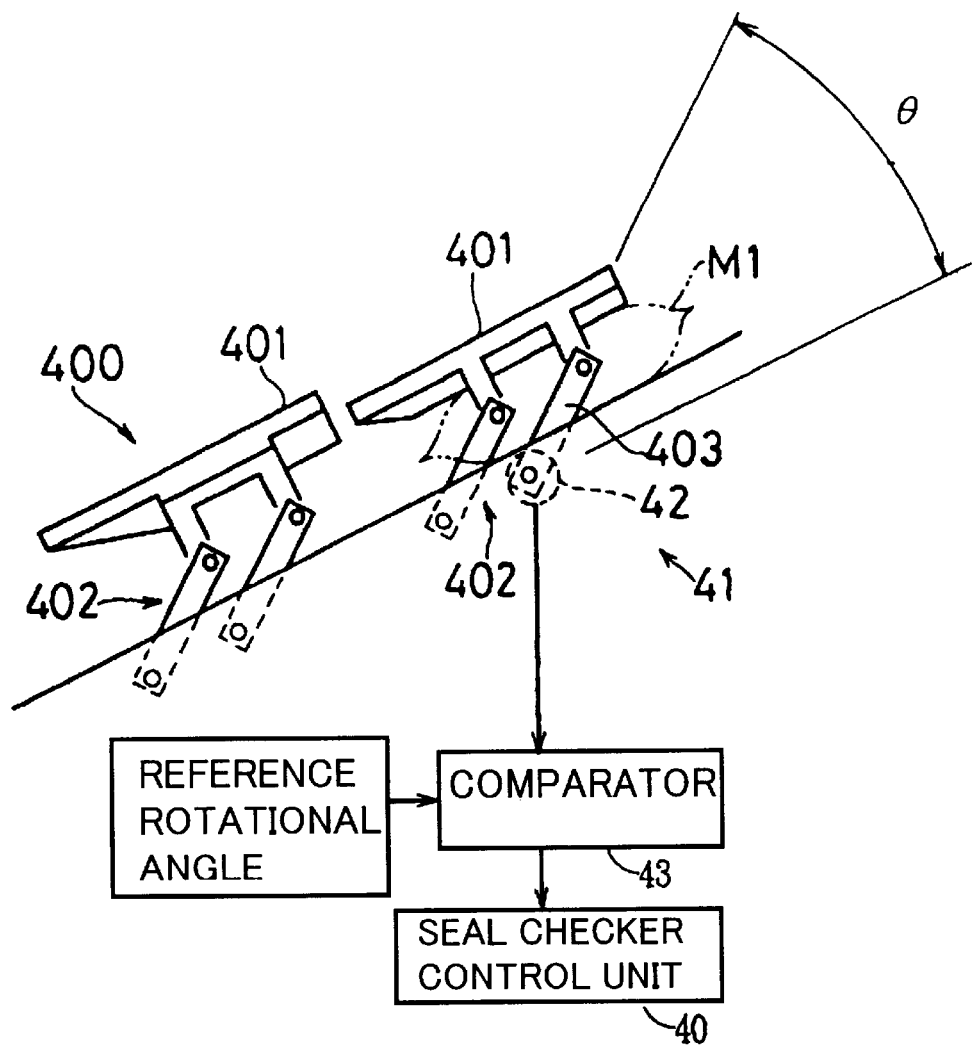
FIG. 4 is a is a schematic structural diagram showing one example of a seal checker.

Referring now to FIG. 4, the seal checker 400 includes a plurality of, for example, two, presser tools 401 each mounted on a respective parallel link mechanism 402 for pivotal motion within a predetermined range of angle. As the bagged products M1 are successively delivered onto the seal checker 400, the presser tools 401 are successively driven to an upwardly shifted position and then move towards a downwardly shifted position by the effect of their own weight to thereby press the corresponding bagged products M1. A rotational angle detector 42 such as, for example, a rotary encoder is provided at the center of rotation of a lower end of one of parallel links 403 of each of the parallel link mechanism 402. The rotational angle detector 42 provides the comparing means 43 with the rotational angle θ (one example of the height information of each bagged product M1) of the parallel links 403. The comparing means 43 then compares the inputted rotational angle θ with a predetermined reference rotational angle (one example of a predetermined threshold value) to determine acceptability or unacceptability (the sealing condition) of the seals in the bagged product M1. More specifically, if the measured rotational angle θ is smaller than the reference rotational angle, the seal checker 400 determines that air is leaking from the bag of the sealed product M1, and outputs a result of detection to a seal checker control unit 40, which result is represented by a defective seal signal indicative of the presence of a defect in one of the seals in the bagged product M1. Alternatively, determination of the sealing condition of the seals in the bagged product M1 may be carried out by reading a proportion of change of the rotational angle θ.

It is to be noted that the seal detecting means 41 may be of a type disclosed in, for example, the International Publication No. WO95/30137.

Figure 5A:
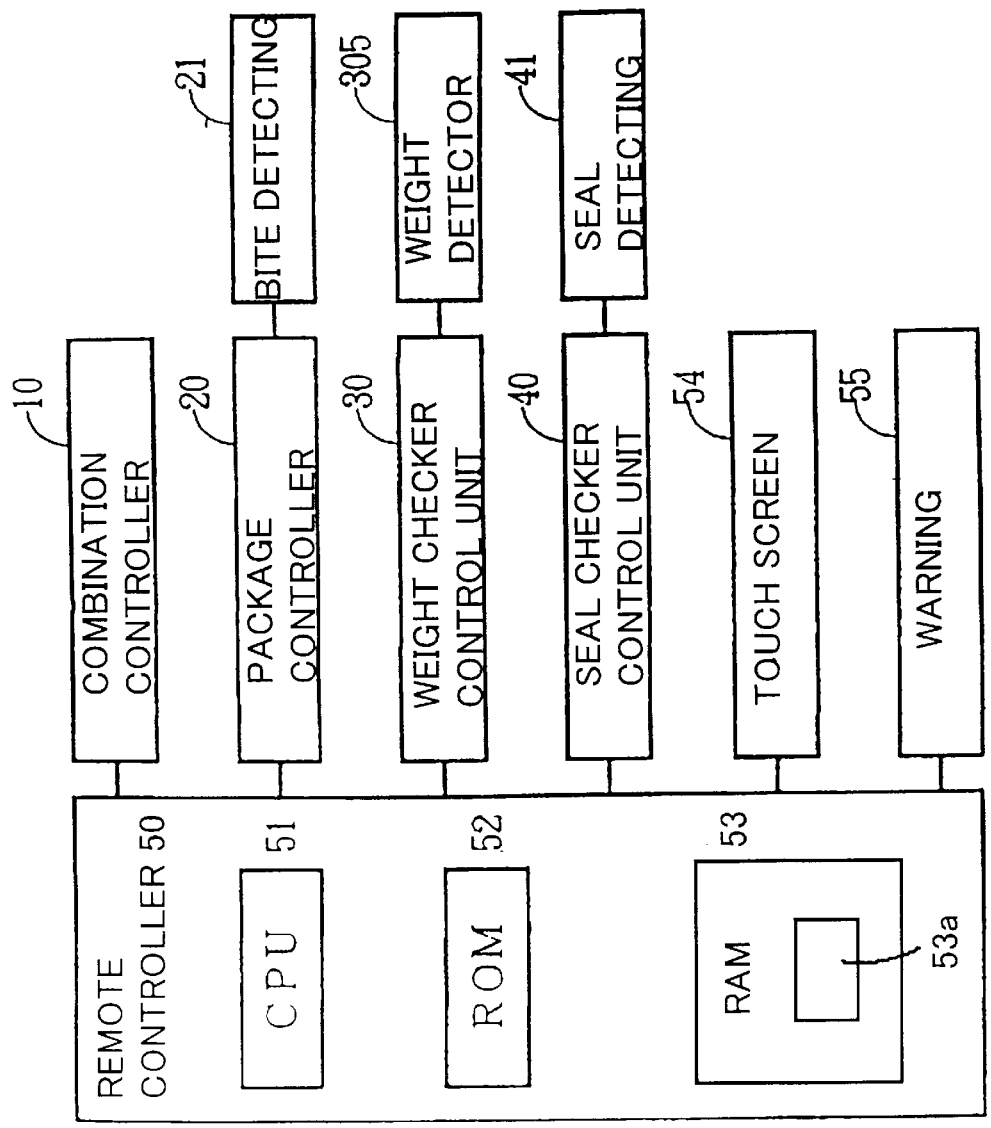
FIG. 5A is a schematic structural diagram showing a relevant portion of the system according to the present invention.

A control device employed in the package inspecting system embodying the present invention will now be described with particular reference to FIG. 5A.

A combination controller 10, a package controller 20, a weight checker control unit 30 and the seal checker control unit 40 are used to control the combination weighing apparatus 1, the packaging machine 200, the weight checker 300 and the seal checker 400, respectively, and are connected with a remote controller 50 so that they can be operatively associated with each other. The remote controller 50 includes a central processing unit (CPU) 51, a read-only memory (ROM) 52, and a random access memory (RAM) 53. The random access memory 53 is provided with a diagnosis history storage 53a shown in FIG. 5B. The diagnosis history storage 53a stores therein results of detection or inspection performed respectively by the bite detecting means 21 and the seal detecting means 41 with respect to the same bagged product M1, in a fashion associated with each other. The remote controller 50 includes a touch screen (an indicating means) 54 and a warning means 55 connected therewith. It is to be noted that the warning means 55 may be employed in the form of a warning lamp and/or a warning buzzer.

As will be described subsequently, the central processing unit 51 refers to the results of detection performed respectively by the bite detecting means 21 and the seal detecting means 41 with respect to the same bagged product M1 to diagnosis an abnormal condition and a content of abnormality occurring in the respective sealers 201 and 202, and then outputs a result of diagnosis to the touch screen 54 and the warning means 55.

A diagnosing process performed by the central processing unit 51 will be described in detail with reference to FIGS. 6A and 5A.

Referring to FIG. 6A, where with respect to the same bagged product M1 the bite detecting means 21 is unable to detect the bite and the result of inspection performed by the seal detecting means 41 has indicated acceptable, the central processing unit 51 diagnoses that both of the sealer 201 and 202 are functioning properly.

On the other hand, where with respect to the same bagged product M1 the result of inspection performed by the seal detecting means 41 has indicated acceptable while the bite detecting means 21 has detected the bite, the central processing unit 51 determines (diagnoses) that a trouble has occurred in the seal checker 400. In other words, in such case, since the accuracy of detection by the seal detecting means 41 is generally worse than that by the bite detecting means 21, the central processing unit 51 diagnoses that although both of the sealers 201 and 202 are functioning properly, the trouble has occurred in the seal checker 400, and then activates the touch screen 54 and the warning means 55, both shown in FIG. 5A to provide a trouble acknowledgement (2) as the result of diagnosis. In the event of the trouble acknowledgement (2), the touch screen 54 provides a visual indication of "Despite detection of the bite of the article, the seal checker does not function properly. Readjust the seal checker." or a similar message like that.

It is to be noted that in such case, since there is the possibility that a clogging may have occurred in one or both of the sealing jaws 207, an additional visual indication of "Check the seal jaws to see if clogging occurs." or a similar message like that may be displayed.

On the other hand, where with respect to the same bagged product M1 no bite is detected by the bite detecting means 21 and, at the same time, the result of detection performed by the seal detecting means 41 is unacceptable (that is, in the event that the seals are found defective because of leakage occurring in the seals), the central processing unit 51 diagnoses that although the end sealer 202 has functioned properly, the vertical sealer 201 has not functioned properly, and then activates the touch screen 54 and the warning means 55 to provide a trouble acknowledgement (3) as the result of diagnosis. In the event of the trouble acknowledgement (3), the touch screen 54 provides a visual indication of "Despite no bite being found, leakage is occurring. Immediately check the vertical sealer," or a similar message like that.

Also, where with respect to the same bagged product M1, the bite has been detected by the bite detecting means 21 and, at the same time, the result of inspection performed by the seal detecting means 41 indicates unacceptable, the central processing unit 51 diagnoses that a problem has occurred in sealing timing of the end sealer 202, and then activates the touch screen 54 and the warning means 55 to provide a trouble acknowledgement (4) as the result of diagnosis. In the event of the trouble acknowledgement (4), the touch screen 54 provides a visual indication of "Bite and leakage have occurred. Change the sealing timing of the end sealer." or a similar message like that.

Figure 6B:
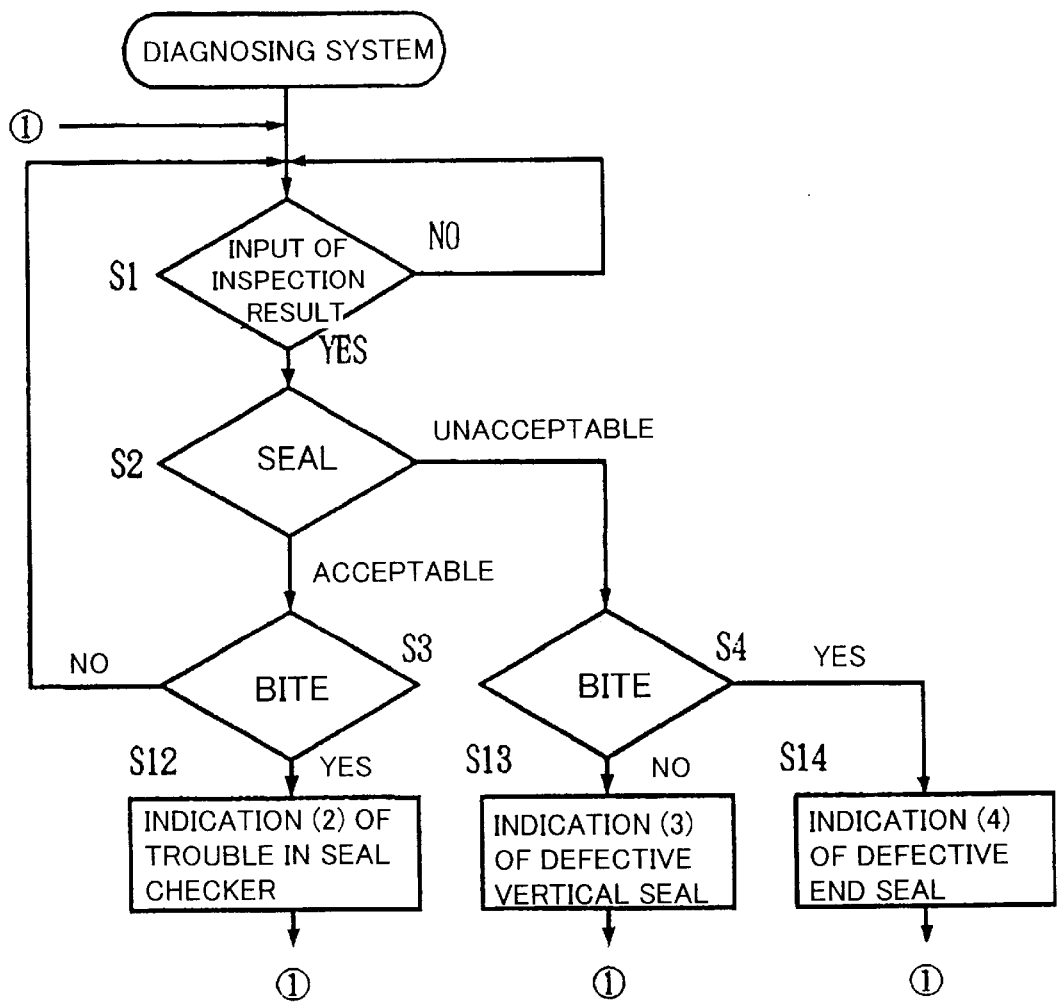
FIG. 6B is a flow chart showing a diagnosing method performed by the system.

The sequence of operation of the central processing unit 51 discussed above will now be described with reference to FIG. 5A and also with reference to the flowchart shown in FIG. 6B.

Subsequent to start of the diagnosing system of the present invention, and when the result of inspection performed by the seal checker control unit 40 is inputted at step S1, the program flow goes to step S2 at which the result of inspection is determined. In the event that the sealing condition is determined acceptable, the program flow goes to step S3, but in the event that the sealing condition is determined unacceptable, the program flow goes to step S4.

At step S3 the result of bite inspection with respect to the particular bagged product is read from the diagnosis history storage 53a, and the program flow returns to step S1 if no bite has been found occurring. On the other hand, if the bite has been found occurring as determined at step S3, the program flow goes to step S12 at which the trouble acknowledgement (2) associated with the seal checker 400 is indicated in the manner described above.

At step S4 the result of bite inspection with respect to the particular bagged product is read from the diagnosis history storage 53a, and the program flow goes to step S13 if no bite has been found occurring, followed by indication of the trouble acknowledgement (3) associated with the longitudinal side edge seal. On the other hand, if the bite has been found occurring as determined at step S4, the program flow goes to step S14 at which the trouble acknowledgement (4) associated with the end seal is indicated.

As described hereinabove, since the diagnosing system of the present invention is such that based on the respective results of detection or inspection performed by the bite detecting means 21 and the seal checker 400 the presence or absence of an abnormal condition in each of the sealers 201 and 202 is diagnosed and a result of diagnosis is subsequently indicated, an operator can quickly take a remedy to remove the trouble occurring in the sealers 201 and 202, based on the result of diagnosis. Accordingly, the productivity and the yield of production of the bagged products M1 can be increased advantageously.

It is to be noted that in the practice of the present invention, without the respective results of inspection of the sealers 201 and 202 being reported, together with the respective results of inspection of the sealers 201 and 202, operating timings of the various devices may be changed by, for example, automatically delaying the sealing timing of the end sealer 202, or the package inspecting system itself may be brought to a halt.

Figure 7:
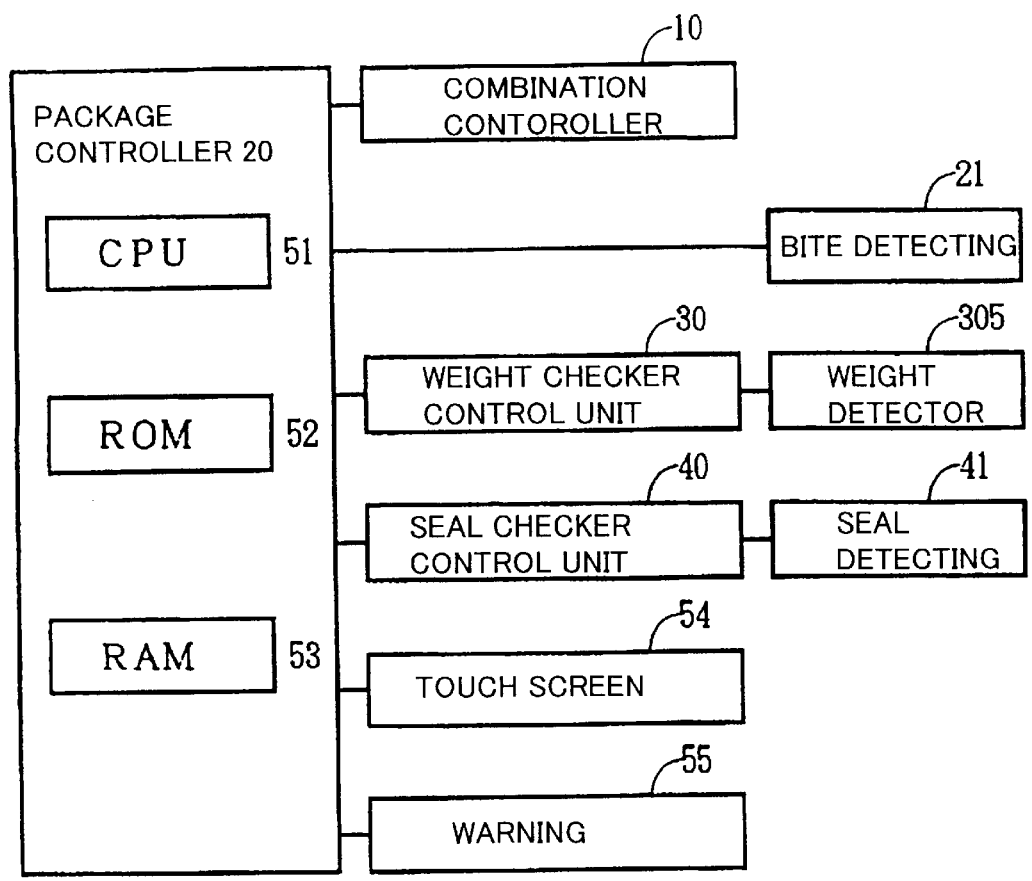
FIG. 7 is a schematic structural diagram showing a modified form of the system.

Also, in the foregoing embodiment the remote controller 50 has been described as employed. However, without the remote controller 50 being employed, the central processing unit 51 may be incorporated in the package controller 20, as shown in FIG. 7, so that the package controller 20 can execute a determining function which has been described as executed by the remote controller 50.

Another embodiment of the control device of the package inspecting system of the present invention will be described with reference to FIG. 8A. A combination controller 10, a package controller 20, a weight checker control unit 30 and a seal checker control unit 40 are used to control the combination weighing apparatus 1, the packaging machine 200, the weight checker 300 and the seal checker 400, respectively, and are connected with a remote controller 50 so that they can be operatively associated with each other. The remote controller 50 includes a central processing unit (CPU) 51, a read-only memory (ROM) 52, and a random access memory (RAM) 53. The random access memory 53 is provided with a diagnosis history storage 53a shown in FIG. 5B.

The diagnosis history storage 53a stores therein a result of determination as to the previously described fore-and-aft symptom and results of detection or inspection performed respectively by the seal checker 400 with respect to the same bagged product M1, all of those results being associated with each other and having been divided for n cycles. The result of determination as to the fore-and-aft symptom is inputted from the weight checker control unit 30, and the result of inspection performed by the seal checker 400 is inputted from the seal checker control unit 40. On the other hand, the result of diagnosis descriptive of the defect seal is a consequence of a cause of the defect seal attributable to either the vertical sealer 201 or the end sealer 202, and this result of diagnosis is determined (diagnosed) by the central processing unit 51 on the basis of the result of determination as to the fore-and-aft symptom and the result of inspection with respect to the same bagged product, which result is stored in the history storage 53a.

It is to be noted that once the defective seal occurs as a result of lowering of the temperature, it will be repeated, and, therefore, if it is repeated a predetermined number of times, for example, three times continuously, one of the sealing devices 201 and 202 is diagnosed defective.

The weight checker control unit 30 performing the determination as to the fore-and-aft symptom will be discussed.

The weight checker control unit 30 includes a microcomputer comprised of a central processing unit, a read-only memory and a random access memory that is provided with a weight history storage 33a as shown in FIG. 9B. The weight history storage 33a stores therein a combined calculated value Wc of the combined articles M which is equal to or close to a target weight that is to be attained when measurement is performed by the combined weighing apparatus 1, and a post-weighed value Ws measured by the weight checker 300, in a fashion associated with each other for each of the bagged products M1. The weight history is stored for each of the bagged products M1 in connection with the first to n-th cycles of weight measurement. The weight checker control unit 30 calculates a gross weight, inclusive of a tare weight, of the respective bagged product M1 based on a weight signal outputted from the weight detector 305. The weight checker control unit 30 also calculates the post-weighed value Ws by subtracting the tare weight from the net weight of the bagged product M1 and, also, compares the post-weighed value Ws with the combined calculated value Wc with respect to the same bagged product M1 to determine the fore-and-aft symptom in a manner which will subsequently be described.

Determination of the fore-and-aft symptom performed by the weight checker control unit 30 will now be described with reference to FIG. 8A and also with reference to the flowchart shown in FIG. 9A.

Subsequent to start of the fore-and-aft symptom determining program, a product detector (not shown) starts detecting a bagged product M1 at step S21. When the bagged product M1 is detected by the product detector, the program flow goes to step S22 at which, based on the weight signal, the gross weight of the bagged product M1 inclusive of the tare weight is calculated, followed by step S23. At step S23, the tare weight of the bagged product M1 is subtracted from the gross weight to obtain the post-weighted value Ws1 and the program flow then goes to step S24.

At step S24, the weight of the bagged product M1 is checked based on a post-weighed value Ws1. Where the post-weighed value Ws1 is not smaller than a predetermined upper limit or not greater than a predetermined lower limit, the bagged product M1 is determined unacceptable (rejected) in that the weight thereof is defective and the program flow then goes to step S25. On the other hand, if the post-weighed value Ws is found between the upper and lower limits, the program flow returns to step S21. At step S25, an activation command is outputted to the sorting device 500, followed by step S26. The sorting device 500 upon receipt of the activation command operates to reject the bagged product M1, which has been determined unacceptable as hereinabove described, out of the system.

At step S26, the post-weighed value Ws1 is compared with the combined calculated value Wc1 and, in the event that the post-weighed value Ws1 is greater than the combined calculated value Wc1, the weight checker 400 determines an overweight, with the program flow consequently going to step S27. On the other hand, in the event that the post-weighted value Ws1 is smaller than the combined calculated value Wc1, the weight checker 400 determines an underweight, with the program flow consequently going to step S31.

At step S27, a post-weighed value Ws0 that was obtained with respect to the previous bagged product M1 is compared with the combined calculated value Wc0 corresponding to the post-weighed value Ws0. In the event that the post-weighed value Ws0 is smaller than the combined calculated value Wc0, the weight checker 400 determines an underweight, with the program flow consequently going to step S28. On the other hand, in the event that as a result of decision at step S27 the post-weighed value Ws0 is found to be greater than the combined calculated value Wc0, the weight checker 400 determines an overweight, with the program flow consequently going to step S30.

At step S28, the fore-and-aft symptom is determined based on the following equation:

$$Ws1_{cur}+Ws0_{pre}=Wc1_{cur}+Wc0_{pre} \quad (1)$$

wherein $Ws1_{cur}$ represents the post-weighed value Ws1 that is currently calculated; $Ws0_{pre}$ represents the post-weighed value Ws0 that has been previously calculated; $Wc1_{cur}$ represents the combined calculated value Wc1 that is currently calculated; and $Wc0_{pre}$ represents the combined calculated value Wc0 that has been previously calculated.

Should the foregoing equation (1) establish, the weight checker control unit 30 determines the occurrence of the fore-and-aft symptom and, then at step S29, causes the weight history storage 33a to store the occurrence of the fore-and-aft symptom in such bagged product M1. On the other hand, in the event that the foregoing equation (1) does not establish, the program flow goes to step S30 at which the weight history storage 33a stores a digit "0" descriptive of non-occurrence of the fore-and-aft symptom in such bagged product M1.

At step S31, the previously calculated post-weighed value Ws0 and the combined calculated value Wc0 are compared with each other and, in the event that the post-weighed value Ws0 is greater than the combined calculated value Wc0, it is determined that an overweight is occurring, with the program flow consequently going to step S28. On the other hand, if a result of decision at step S31 indicates that the post-weighed value Ws0 is smaller than the combined calculated value Wc0, it is determined that an underweight is occurring, with the program flow consequently going to step S32 at which a digit "0" descriptive of non-occurrence of the fore-and-aft symptom is stored in the weight history storage 33a.

Figure 8A:
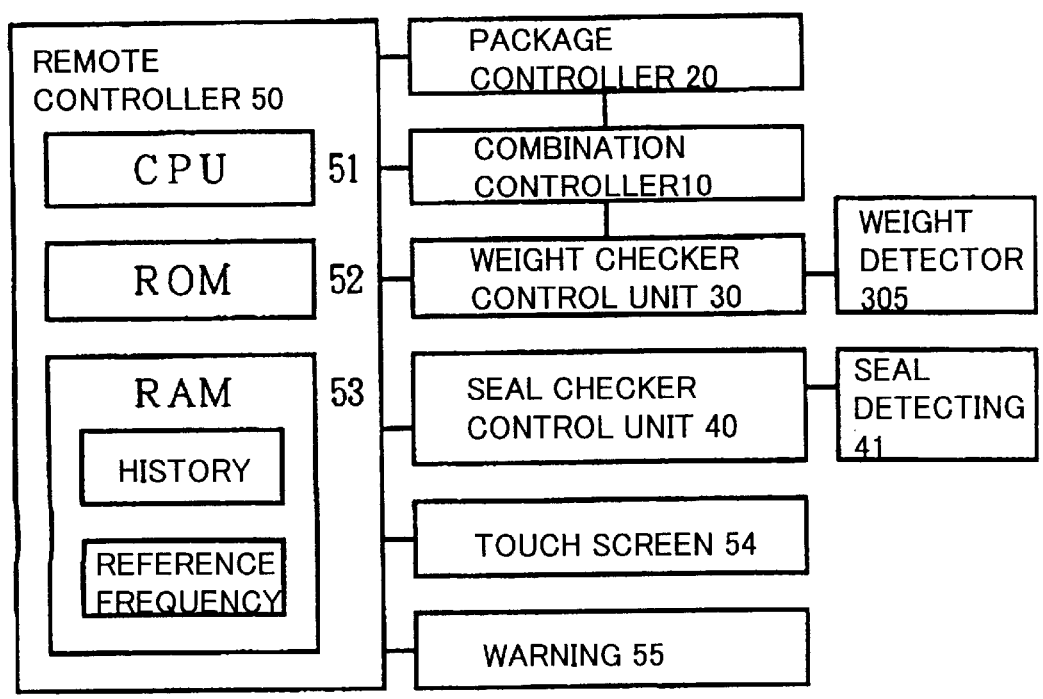
FIG. 8A is a schematic structural diagram showing a relevant portion of a different system according to the present invention.
Figure 9A:
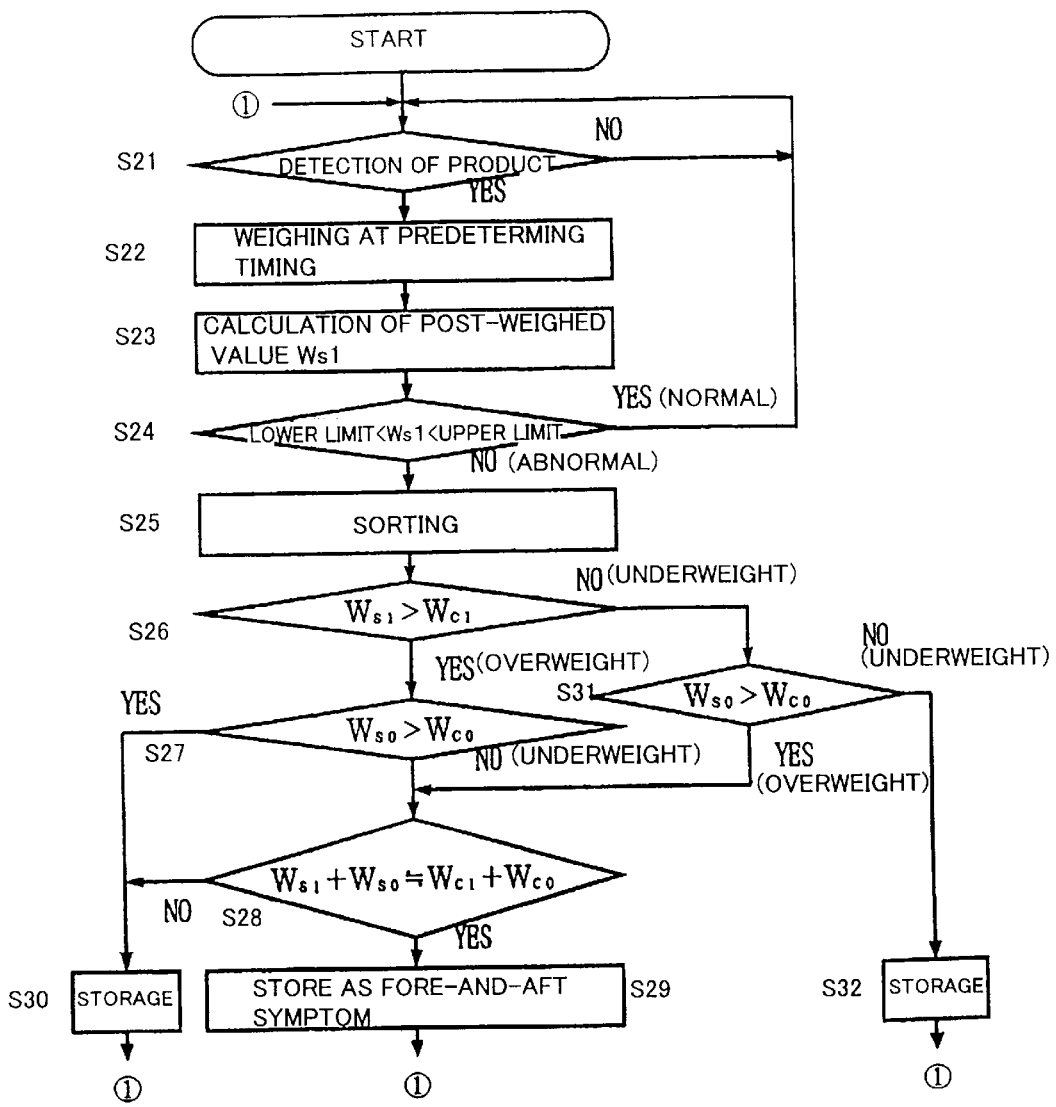
FIG. 9A is a flow chart showing the sequence of operation of a weight checker control of the system.

The result of determination of the fore-and-aft symptom is outputted from the weight checker control unit 30 of FIG. 8A to the remote controller 50 and is then stored in the history storage 53a in the remote controller 50. The remote controller 50 is connected with the touch screen (an indicating means) 54 and the warning means 55. It is to be noted that the warning means 55 may be employed in the form of a warning lamp and/or a warning buzzer.

As will subsequently be described, the central processing unit 51 refers to the result of determination on the fore-and-aft symptom and the result of inspection performed by the seal detecting means 41 with respect to the same bagged product M1 to diagnosis an abnormal condition and a content of abnormality occurring in the respective sealers 201 and 202, and then outputs a result of diagnosis to the touch screen 54 and the warning means 55.

A process of diagnosis on a cause of a defect executed by the central processing unit 51 will now be described with reference to the flowchart shown in FIG. 10.

Subsequent to start of the diagnosing system of the present invention, and when at step S40, a result of inspection of the seals is inputted from the seal checker control unit 40 to the central processing unit 51, a decision step takes place at step S41. In the event that a result of decision at step S41 indicates that the result of inspection is acceptable, the program flow returns to step S40, but in the event that the result of decision at step S41 indicates the result of inspection is unacceptable, the program flow goes to step S42.

At step S42, the central processing unit 51 reads the result of determination on the fore-and-aft symptom with respect to the same bagged product M1 from the history storage 53a and, in the event of occurrence of the fore-and-aft symptom, the program flow goes to step S43, but in the event of non-occurrence of the fore-and-aft symptom, the program flow goes to step S50.

At step 43, since the result of inspection by the seal checker 400 indicates unacceptable and the occurrence of the fore-and-aft symptom, it is diagnosed that the biting timing of the sealing jaws 207 of the end sealer 202 of FIG. 2 is deviated with respect to the fall of the article M and such result of diagnosis is not only stored in the history storage 53a shown in FIG. 8A, but also displayed through the touch screen 54. In such case, the touch screen 54 will provide a visual indication of "Seal checker defective·occurrence of the fore-and-aft symptom→Check the sealing timing of the end sealer to see if it is in order." or a similar message like that.

At step S44 following step S43, a decision is carried out to determine if the status of the seal checker unacceptable·occurrence of the fore-and-aft symptom is continuously repeated a predetermined number of times, for example, three times. If it is determined that such status is continuously repeated a number of times grater than the predetermined number of times, the program flow goes to step S46. At step S46, it is determined that the biting timing of the sealing jaws 207 of the end sealer 202 is deviated, and not only is the indicating means 55 activated, but also such status is displayed through the touch screen 54. At the same time, outputting of the discharge command signal to the combination weighing apparatus 1 is halted and, also, the packaging operation of the packaging machine 200 is halted. In such case, the touch screen 54 may provide a visual indication of, for example, "Seal checker defective·occurrence of the fore-and-aft symptom occurring XX times. For this reason, the packaging operation is halted. Immediately reconfirm the sealing timing of the end sealer." or a similar message like that.

If as a result of decision at step S44 it is determined that the status of the seal checker unacceptable-occurrence of the fore-and-aft symptom is not repeated the predetermined number, the flow goes to step S45. At step S45 the number of times in which the end seal was determined defective based on the recent n results of diagnosis stored in the history storage 53a is counted to determine the frequency of occurrence and the frequency of occurrence of the defective end seal, which has been recently calculated, is subsequently compared with a predetermined reference frequency. Where as a result of this comparison the frequency of occurrence is smaller than the reference frequency, the program flow goes back to step S40, but where the frequency of occurrence is greater than the reference frequency, the program flow goes to step S46A at which as is the case with step S46, indicating and display are effected through the touch screen 54 and, also, the packaging operation is halted. It is to be noted that in such case, the touch screen 54 will provide a visual indication of "Seal checker defective·occurrence of the fore-and-aft symptom is frequently occurring. For this reason, the packaging operation is halted. Immediately reconfirm the sealing timing of the end sealer." or a similar message like that.

On the other hand, since at step S50 inspection by the seal checker 40 indicates that the end seal was defective and no fore-and-aft symptom did occur, it is diagnosed (inferred) that although the biting timing of the end sealer 202 is in good order, but there is the possibility that a trouble has occurred in either the vertical sealer 201 or the end sealer 202, and, hence, such result of diagnosis is stored in the history storage 53a of FIG. 8A and, also, displayed through the touch screen 54. In such case, the tough screen 54 will provide a visual indication of "Seal checker defective→Reconfirm the sealing temperature for each sealer." or a similar message like that.

Step S51 follows step S50. At step S51, based on the recent n results of diagnosis stored in the history storage 53a, the number of times in which the possibility is inferred that the trouble has occurred in either the vertical sealer 201 or the end sealer 202 is counted and, where the count is smaller than, for example, 3, the program flow goes back to step S40, but where the cont is equal to 3, the program flow goes to step S52. At step S52, either the vertical edge sealer 201 or the end sealer 202 is determined involving the trouble. Accordingly, not only is the indicating means 55 activated and such status is displayed through the touch screen 54, but also outputting of the discharge command signal to the combination weighing apparatus 1 is halted and the packaging operation of the packaging machine 200 is halted. In such case, the touch screen 54 will provide a visual indication of "Seal checker defective continuing. For this reason, the packaging operation is halted. Immediately check each of the sealers." or a similar message like that.

It is to be noted that in the case of step S52 there may be a possibility that the seal checker itself may be operating improperly and, therefore, such possibility may be displayed additionally.

As discussed hereinabove, according to the diagnosing system of the present invention, since based on the results of inspection performed by the weight checker 300 and the seal checker 400 the central processing unit 51 diagnoses and then warns the presence or absence of the abnormality in each of the vertical sealer 201 and the end sealer 202, the operator can quickly remove the trouble occurring in one or both of the sealers 201 and 202 based on the result of diagnosis. Accordingly, not only the productivity of the bagged products M1, but also the yield of production of the bagged products M1 can be increased.

Figure 10:
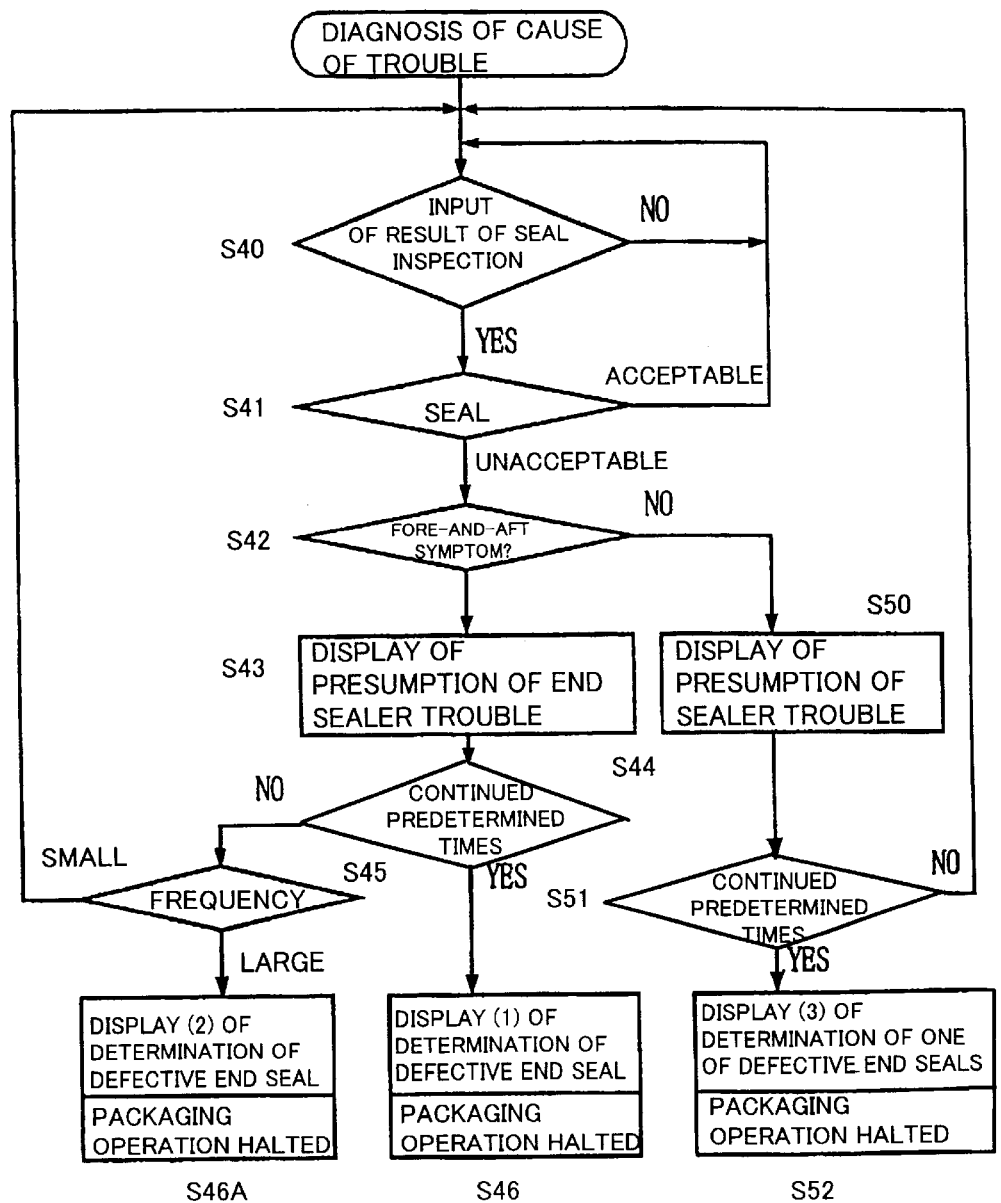
FIG. 10 is a flow chart showing the diagnosing method performed by the system.

In the foregoing embodiment, it has been described that depending on whether or not the fore-and-aft symptom occurs at step S42 in FIG. 10, the presence or absence of the abnormal condition in one or both of the sealers 201 and 202 is determined. However, in the practice of the present invention, depending on whether the result of inspection by the weight checker 300 at step S42 indicates acceptable or whether the result of inspection by the weight checker 300 at step S42 indicates unacceptable, the presence or absence of the abnormal condition in one or both of the sealers 201 and 202 may be determined. This is because if the end sealer 202 fails to operate properly, both of the defective seal and the defective weight (as determined at step S24) generally often occur simultaneously.

It is also to be noted that in the practice of the present invention, not only is the result of diagnosis of the sealers 201 and 202 displayed, but also the operating timing of the various devices can be automatically changed in such a way, for example, that the sealing timing of the end sealer 202 is automatically delayed. Also, without the packaging operation being halted, the result of diagnosis may simply be displayed.

Figure 11:
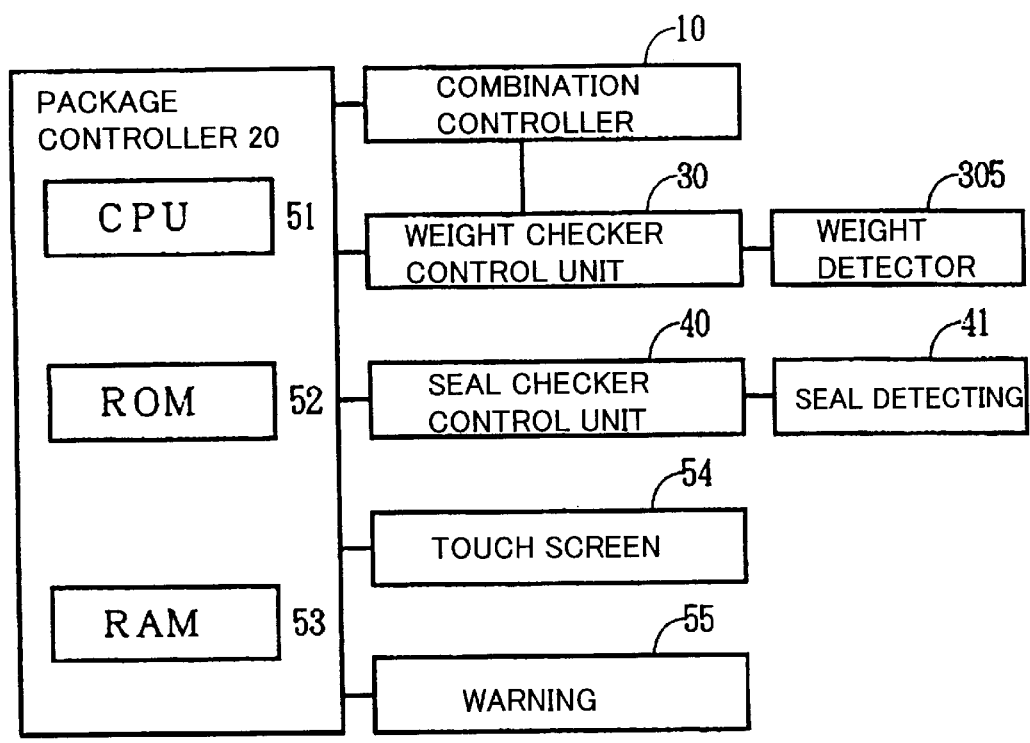
FIG. 11 is a schematic structural diagram showing a further modified form of the system.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in the foregoing embodiment the use has been made of the remote controller 50, it is possible that without the remote controller 50 being employed, the central processing unit 51 may be incorporated in the package controller 20, as shown in FIG. 11, so that the package controller 20 can execute a determining function which has been described as executed by the remote controller 50.

Accordingly, such changes and modifications are, unless they depart from the scope of the present invention as delivered from the claims annexed hereto, to be construed as included therein.

What is claimed is:

1. A package inspecting system, which comprises:
   a packaging machine including a vertical sealing device for sealing opposite longitudinal side edges of a packaging material, which extend in a direction conforming to a direction of flow of the packaging material, together to render the packaging material into a tubular form, and an end sealing device for sealing an end of the tubular packaging material after articles have been filled in the tubular packaging material, to thereby provide a bagged product;
   a seal checker for inspecting a sealing condition of the packaging material of the bagged product;
   a bite detecting means provided in the packaging machine for detecting whether or not the articles are bitten in the end of the packaging material; and
   a determining means for determining the presence or absence of an abnormal condition or a content of abnormality in each of the sealing devices according to a combination, of both, of a result of detection performed by the bite detecting means and a result of inspection performed by the seal checker with respect to the same bagged product.

2. The package inspecting system as claimed in claim 1, wherein when a bite is detected by the bite detecting means and a defective seal is found by the seal checker with respect to the same bagged product a timing of sealing operation by the end sealing device is diagnosed as having a problem.

3. The package inspecting system as claimed in claim 1, wherein when no bite is detected by the bite detecting means and a defective seal is found by the seal checker with respect to the same bagged product, the vertical sealing device is diagnosed as having a problem.

4. The package inspecting system as claimed in claim 1, further comprising an indicating means for informing a result of the diagnosis.

5. The package inspecting system as claimed in claim 1, wherein the bite detecting means is operable to detect information concerning a distance between a pair of sealing jaws used in the end sealing device to press the packaging material, to thereby detect the bite of the articles.

6. The package inspecting system as claimed in claim 1, wherein the seal checker is operable to determine acceptability or unacceptability of the seal in the bagged product based on height information of the bagged product, when the latter is pressed from the above, and a threshold value.

7. A package inspecting system, which comprises:
   a packaging machine including a vertical sealing device for sealing opposite longitudinal side edges of a packaging material, which extend in a direction conforming to a direction of flow of the packaging material, together to render the packaging material into a tubular form, and an end sealing device for sealing an end of the tubular packaging material after articles have been filled in the tubular packaging material, to thereby provide a bagged product;

a weight checker for weighing the bagged product;

a sealer checker for inspecting a sealing condition of the packaging material of the bagged product;

a determining means for diagnosing an abnormal condition or a content of abnormality occurring in each of the sealing devices according to a combination, of both, of respective results of detection performed by the seal checker and the weight checker with respect to the same bagged product; and an indicating means operable to indicate a result of the diagnosis.

8. The package inspecting system as claimed in claim 7, wherein when the respective results of inspection performed by the seal and weight checkers with respect to the same bagged product indicate unacceptable, the end sealing device is diagnosed as having a cause of trouble.

9. The package inspecting system as claimed in claim 7, wherein when determination of an unacceptable condition as a result of inspection performed by the seal checker continues, either the vertical sealing device or the end sealing device is diagnosed as function properly.

10. The package inspecting system as claimed in claim 9, wherein when determination of an unacceptable condition as a result of inspection performed by the seal checker continues, a packaging operation of the packaging machine is halted.

11. A package inspecting system comprising:

a packaging machine including a longitudinal seal former operable to seal opposite longitudinal edges of a packaging material together to render the packaging material into a tubular form, and an end seal former operable to seal an end of the tubular packaging material after articles have been filled in the tubular packaging material, to thereby provide a bagged product inside a formed bag;

a seal checker operable to check the integrity of a seal on the packaging material of the bagged product;

a bite detector operable to determine whether bagged articles have been caught in the sealed end of the packaging material; and a controller operable to diagnose an abnormal condition based on a combination, of both, of signals from the seal checker and the bite detector with respect to a single formed bag.

12. The package inspecting system of claim 11, wherein the controller is operable to diagnose a problem with the seal checker based on a combination of an indication of an acceptable seal from the seal checker and an indication of an article caught in the sealed end from the bite detector.

13. The package inspecting system of claim 11, wherein the controller is operable to diagnose a problem with the longitudinal seal former based on a combination of an indication of an unacceptable seal condition from the seal checker and an indication of an absence of an article caught in the sealed end from the bite detector.

14. The package inspecting system of claim 11, wherein the controller is operable to diagnose a problem with the end seal former based on a combination of an indication of an unacceptable seal condition from the seal checker and an indication of an article caught in the sealed end from the bite detector.

15. A package inspecting system comprising:

a packaging machine including a longitudinal seal former operable to seal opposite longitudinal edges of a packaging material together to render the packaging material into a tubular form, and an end seal former operable to seal an end of the tubular packaging materials after articles have been filled in the tubular packaging material, to thereby provide a bagged product inside a formed bag;

a weight checker operable to check the weight of the product inside the formed bag;

a seal checker operable to check the integrity of a seal on the packaging material of the bagged product;

a controller operable to diagnose an abnormal condition based on a combination, of both, of signals from the seal checker and the bite detector with respect to a single formed bag.

16. The package inspecting system of claim 15, wherein the controller is operable to diagnose a problem with the end seal former based on a combination of an indication of an unacceptable seal from the seal checker and an unacceptable weight of bagged product inside a formed bag from the weight checker.

17. The package inspecting system of claim 15, wherein the controller is operable to diagnose a problem with at least one of the longitudinal sealer and the end sealer based on continued occurrence of multiple indications of an unacceptable seal from the seal checker.

18. The package inspecting system of claim 15, wherein the controller is operable to diagnose a fore-and-aft problem between sequential formed bags based on results of weight checks performed on sequential bags by the weight checker.

19. The package inspecting system of claim 18, wherein the controller is operable to diagnose a problem with the longitudinal seal former based on a combination of a diagnosis of a fore-and-aft problem and an indication of an unacceptable seal from the seal checker.

20. The package inspecting system of claim 18, wherein the controller is operable to diagnose a problem with the end seal former based on a combination of a nonoccurrence of a diagnosis of a fore-and-aft problem and an indication of an unacceptable seal from the seal checker.

* * * * *